June 30, 1964 D. RICHMAN 3,139,484

COMPATIBLE COLOR-TELEVISION APPARATUS

Filed Feb. 10, 1961 2 Sheets-Sheet 1

June 30, 1964 D. RICHMAN 3,139,484

COMPATIBLE COLOR-TELEVISION APPARATUS

Filed Feb. 10, 1961 2 Sheets-Sheet 2

3,139,484

COMPATIBLE COLOR-TELEVISION APPARATUS

Donald Richman, Fresh Meadows, N.Y., assignor to Hazeltine Research, Inc., a corporation of Illinois Filed Feb. 10, 1961, Ser. No. 88,475
4 Claims. (Cl. 178—5.4)

Figure 1:
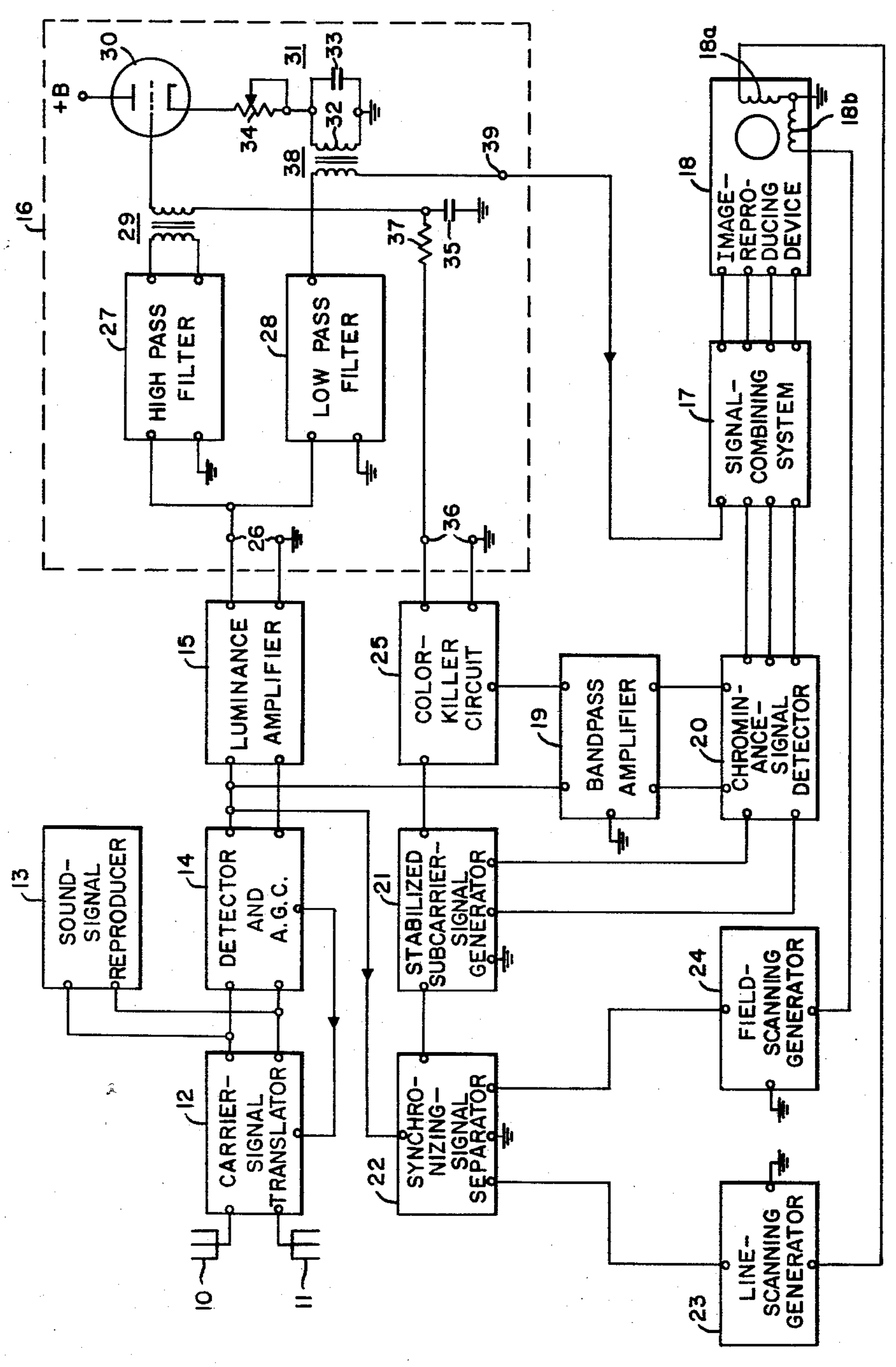

This invention relates to compatible color-television receivers and, more particularly, to a compatible color-television apparatus permitting subjective high-frequency accentuation during monochrome reception while retaining accurate tuning for color reception and for improving resolution during monochrome reception. In this specification, the terms "luminance channel" and "monochrome channel" are used interchangeably.

The invention will be described with reference to the well known NTSC television system now in use in the United States. In this system a wide band width signal (having a band width of approximately 4 megacycles) representative of the luminance of a scene is combined with a narrower bandwidth signal representative of the chrominance, this latter signal being included as a subcarrier wave signal (nominally 3.58 megacycles) to produce a composite video frequency signal which is used to modulate the transmitter output.

A receiver in such a television system intercepts the radiated signal and derives the composite video frequency signal including the luminance and chrominance signals therefrom. One type of such receiver includes a pair of principal channels for individually translating the luminance and chrominance information for application to an image-reproducing device in such receiver. The channel for translating the luminance signals is substantially the same as the video frequency amplifier stages of a conventional monochrome receiver. The principal difference is that the bandwidth of the luminance or monochrome channel of a color receiver must be limited to prevent the chrominance subcarrier signals from passing through the luminance channel and thereby degrading the reproduced image. Thus, in previous compatible color-television receivers the necessity for limiting the bandwidth of the luminance or monochrome channel during color reception has resulted in a substantially identical limiting of the monochrome channel bandwidth during monochrome reception. The result is that existing compatible color receivers do not utilize fully the received monochrome signal and as a result reproduce received monochrome images with much poorer resolution than quality monochrome receivers.

In practice, it has been found that the average viewer of an existing television receiver prefers to subjectively detune or mis-tune the receiver during monochrome reception. This is so because by such detuning (through use of the fine tuning control, for example) it is possible to achieve a resulting image in which objects appear to have sharper edges and which is generally more pleasing subjectively. The viewer accomplishes this by unknowingly tuning the receiver to a frequency slightly higher than is actually correct for a particular incoming television signal. In this way an intermediate-frequency signal is produced in which the picture carrier signal is moved closer to the lower limit of the IF amplifier response and the high-frequency portion is correspondingly moved further into the IF pass band than is actually correct. This produces greater than normal amplification of the high-frequency portion of the signal and thereby makes edges appear sharper.

In modern intercarrier receivers this detuning produces substantially no accompanying undesirable effects during monochrome reception. However, in a compatible color receiver, such detuning during monochrome reception will result in an unacceptable color image reproduction if the receiver is not retuned. Alternate light and dark areas will occur in the picture as a result of a 920 kilocycle beat-note produced by interaction between the color and sound subcarriers. Thus, the viewer will be forced to retune to decrease amplification of the sound subcarrier to its correct relative value and thereby eliminate the objectionable beat. At this point the receiver is substantially correctly tuned and produces an acceptable color picture. However, during monochrome reception the viewer will wish to detune again, resulting in a bothersome waste of effort in the use of existing receivers.

It is, therefore, an object of the present invention to provide a new and improved compatible color-television apparatus in which the deficiencies of prior such systems are diminished.

It is a further object of this invention to make possible a compatible color-television apparatus which permits subjective high-frequency accentuation during monochrome reception while retaining accurate tuning for color reception.

It is an additional object of the present invention to provide a compatible color-television apparatus which makes possible improved resolution during monochrome reception.

It is another object of this invention to provide a compatible color-television apparatus of relatively simple construction which makes possible a reproduced monochrome image of improved quality and which is capable of utilizing the current standard television signals.

In accordance with the invention a compatible color-television apparatus for permitting subjective high-frequency accentuation during monochrome reception while retaining accurate tuning for color reception and for improving resolution during monochrome reception comprises first means for supplying a wide bandwidth monochrome signal, second means for separating this signal into two portions and means for recombining the two portions so that during color reception the portion including undesirable chrominance signals is substantially deleted from the resulting signal but during monochrome reception a wide bandwidth signal is re-formed with high-frequency accentuation.

For a better understanding of the present invention, together with other and further objects thereof, reference is had to the following description taken in connection with the accompanying drawings, and its scope will be pointed out in the appended claims.

Figure 2A:
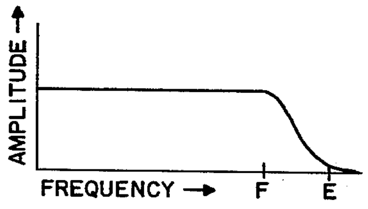
Figure 3:
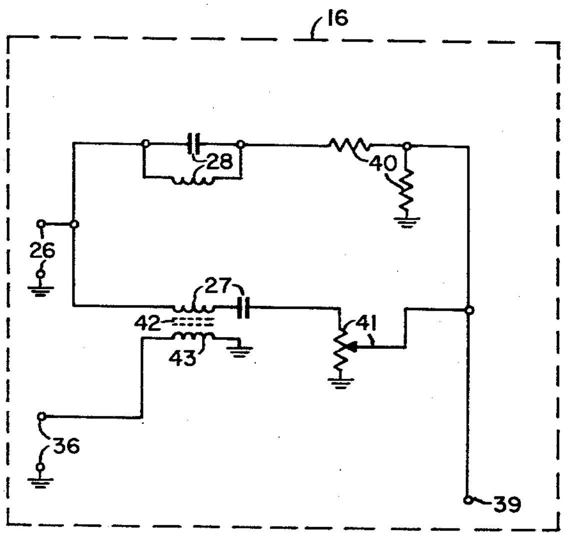

Referring to the drawings:

FIG. 1 is a circuit diagram of a complete compatible color-television receiver including apparatus constructed in accordance with the present invention;

FIG. 2*a* comprises four graphs used in explanation of the operation of the invention, and FIG. 3 is an alternative embodiment of apparatus 16 of FIG. 1.

*Description and Operation of FIG. 1*
*Color-Television Receiver*

Referring to the drawing, the color-television receiver there represented comprises an antenna system 10, 11 of conventional construction for supplying a received composite color-television signal to a carrier-signal translator 12. The carrier-signal translator 12 may include, for example, a radio-frequency amplifier, an oscillator-modulator, and an intermediate-frequency amplifier, all of conventional construction. These units serve to amplify the received composite signal and change its carrier frequency to an intermediate-frequency value. The intermediate-frequency composite signal is, in turn, supplied to a sound-signal reproducer 13 which is effective to extract the sound carrier therefrom, detect the audio component thereof, and utilize the same to reproduce sound. To this end, the sound-signal reproducer 13 may include a sound intermediate-frequency amplifier, a frequency-modulation signal detector, an audio-frequency amplifier, and a loudspeaker, all of conventional construction.

The intermediate-frequency composite signal is also supplied to a detector and AGC unit 14 of conventional construction. The AGC portion of unit 14 is effective to supply a control voltage to appropriate stages of the carrier-signal translator 12 for controlling the gain of those stages in a conventional manner. The detector portion of unit 14 serves to extract the composite video-frequency signal from the intermediate-frequency composite signal and supply the composite video signal to wide bandwidth luminance amplifier 15, which is of conventional design and which, in turn, supplies the amplified video signal, to apparatus 16 constructed in accordance with the present invention as will be described more fully hereinafter. Signals appearing at the output of apparatus 16 are then coupled to a conventional signal-combining system 17 and from there to image-reproducing device 18 which may be a conventional picture tube.

The color-television receiver also includes a chrominance-signal channel for translating the chrominance-signal component of the composite video signal supplied by the detector 14, the chrominance-signal channel including a bandpass amplifier 19, of conventional construction, which, in turn, is coupled in cascade with a chrominance-signal detector 20 and a portion of the signal-combining system 17. The chrominance-signal detector may include, for example, a pair of synchronous detectors for deriving the desired red and blue color-difference signals from the chrominance signal supplied thereto by the bandpass amplifier 19. Coupled to the chrominance-signal detector 20 is a stabilized subcarrier-signal generator 21 which is effective to supply properly phased subcarrier reference signals to the synchonous detectors of the chrominance-signal detector 20 for enabling the detection of the color-difference signals. The color-difference signals from the detector 20 are supplied to the signal-combining system 17 which is effective to combine the color-difference signals and luminance signal to derive the desired red, green and blue color signals which, in turn, are supplied to the corresponding control electrodes of the image-reproducing device 18.

The composite video signal from the detector 14 is also supplied to a synchronizing-signal separator 22 which is effective to separate the subcarrier-synchronizing, the line-synchronizing, and field-synchronizing signal components from the composite video signal and from each other. The line-synchronizing component is supplied to a conventional line-scanning generator 23 and is effective to control generation of suitable recurrent line-scanning signals therein. The line-scanning signals are, in turn, supplied to an appropriate horizontal deflection winding **18*a* associated with the picture tube 18. In a like manner, the field-synchronizing signals are supplied to a conventional field-scanning generator 24 and are effective to control generation of field-scanning signals therein which, in turn, are supplied to an appropriate vertical deflection winding 18*b* also associated with the picture tube 18. The subcarrier-synchronizing component is supplied to the subcarrier-signal generator 21** in order to properly synchronize the phase of the subcarrier reference signals generated therein.

An output signal of the stabilized subcarrier-signal generator 21 is also employed in the color-killer circuit 25 to develop a bias potential which renders the bandpass amplifier 19 nonconductive except when color signals are being received. A signal developed by the color-killer circuit 25 is also utilized in apparatus 16, as will be more fully explained hereinafter.

The antenna system 10, 11 and the units 12–25, inclusive, with the exception of the signal-modifying apparatus 16 may be of conventional construction and operation so that a detailed description and explanation of the operation thereof are unnecessary herein.

*Description and Operation of Apparatus 16*

Referring now to apparatus 16 of FIG. 1, there is illustrated a compatible color-television apparatus for permitting subjective high-frequency accentuation during monochrome reception while retaining accurate tuning for color reception, and for improving resolution during monochrome reception. This apparatus includes first means, for supplying a wide bandwidth monochrome signal, shown as terminals 26 which receive wide band video information from luminance amplifier 15.

The apparatus further includes means for separating the supplied signal into two portions, a first portion including substantially all frequencies above the lowest undesirable chrominance signal frequency and a second portion comprising the remainder of the wide bandwidth signal. For the purposes of this specification, the term "undesirable chrominance signals" is intended to refer generally to chrominance information which enters the luminance channel of the color receiver along with the luminance information signals. More specifically, the term refers to the portion of the chrominance information which, if allowed to pass through a wide bandwidth luminance channel, would produce undesirable or objectionable degradation of the reproduced image. This portion normally includes the chrominance signal subcarrier and the major side-band components associated with this subcarrier. These means are illustrated as high pass filter 27 and low pass filter 28.

The apparatus also includes means for recombining the two portions of the signal so that during color reception undesirable chrominance signals are substantially deleted from the resulting signal, but during monochrome reception a wide bandwidth signal is re-formed and the relative magnitudes of the two portions of this recombined signal are independently adjustable. These means are illustrated as variable gain means including transformer 29 whose primary is connected to the output of filter 27 and one end of whose secondary connects to the control electrode of valve 30. The valve 30 is shown as a vacuum tube which includes in its cathode circuit, tuned circuit 31, comprising an inductance 32 and a capacitance 33, and also a gain control shown as potentiometer 34. The other end of the secondary of transformer 29 is coupled to ground through capacitor 35 and to input terminals 36 through resistor 37. These means also include a transformer 38 whose secondary connects between the output of filter 28 and terminal 39. The primary of transformer 38 is the inductance 32 of tuned circuit 31.

In operation, signals applied to terminals 26 by wide-band luminance amplifier 15 have a bandwidth substantially as shown in FIG. 2*a*. FIG. 2*a* represents an ideal monochrome channel frequency response in which frequency E is normally about 4.5 megacycles per second This wide bandwidth signal is then applied to filters 27 and 28. Frequency response of low pass filter 28 is illustrated by FIG. 2*b* in which frequency F represents the chorminance subcarrier-signal frequency. Thus, signals appearing at the output of low pass filter 28 will flow through the secondary of transformer 38 and appear substantially without change at terminal 39.

Figure 2C:
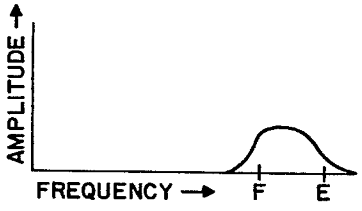
Figure 2B:
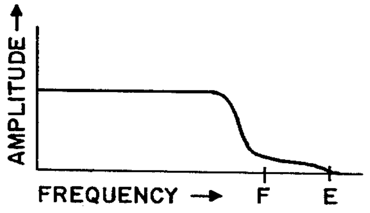
Figure 2D:
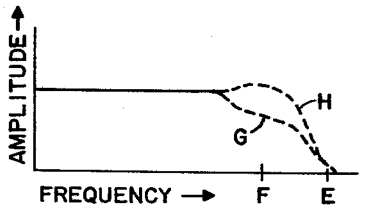

Frequency response of high pass filter 27 is illustrated in FIG. 2*c*. Signals appearing at the output of this filter pass through transformer 29 to the control electrode of valve 30, which is shown as a conventional cathode-follower amplifier. Assuming that the television receiver is receiving monochrome signals, no signals are coupled to terminals 36 from color-killer circuit 25 and the potentials on the electrodes of valve 30 are such that the signals appearing at the control electrode from filter 27 will be amplified. A portion of these amplified signals will appear across inductor 32 and will be coupled to the secondary of transformer 38. Thus, it will be seen that the signals passed by filter 28 (as represented by FIG. 2*b*) and the signals passed by filter 27 (as represented by FIG. 2*c*) will be recombined by transformer 38 during monochrome reception and the signals appearing at terminal 39 will have a bandwidth as shown in FIG. 2*d*. It will now be seen that the frequency characteristic of FIG. 2*d* resembles the wide band frequency response illustrated in FIG. 2*a*. However, since the gain of the signals from filter 27 may be controlled by adjustment of potentiometer 34, the magnitude of the high-frequency end of the response of FIG. 2*d* may now be adjusted independently of the remainder of this frequency response. This result is illustrated in FIG. 2*d*, wherein the two dotted high-frequency portions G and H of the curve represent responses which can be achieved by proper adjustment of potentiometer 34.

During color reception color-killer circuit 25 provides a bias potential which is coupled to the control electrode of valve 30 via terminals 36, resistor 27 and the secondary of transformer 29. This potential arriving at a control electrode is effective to cut off valve 30 during color reception. Thus, it will be seen that no signals will appear across inductance 32 of transformer 38 and only the signals passed by low pass filter 28 will reach terminal 39 during color reception.

It will now be appreciated that since the response of apparatus 16 during color reception resembles the curve of FIG. 2*b*, no undesirable chrominance signals will be permitted to reach signal-combining system 17 through the output terminal 39. However, during monochrome reception the response of apparatus 16 will resemble the curve of FIG. 2*d* and a wide bandwidth signal including substantially all received video information will be coupled to signal-combining system 17, and the high-frequency portion of the signal will be subjectively adjustable. The circuit of apparatus 16 must, of course, be designed so that the two portions of the signal are recombined with the required phase relationships.

Referring now to FIG. 3, there is shown an alternative embodiment of apparatus 16 of FIG. 1. In this arrangement filter 28 is shown as a parallel tuned circuit which has a response substantially as shown in FIG. 2*b* and filter 27 is shown as a series tuned circuit having a response substantially as shown in FIG. 2*c*. The output of filter 28 is attenuated by voltage divider 40 and appears at output terminal 39 and the output of filter 27 is adjustably attenuated by potentiometer 41 and also appears at output terminal 39. Thus, during monochrome reception the recombined signal appearing at terminal 39 resembles FIG. 2*d* and by adjustment of potentiometer 41 can be varied to produce responses such as G and H of FIG. 2*d*. During color reception the ferrite core 42 associated with the inductance of filter 27 is saturated by means of a signal applied to saturating winding 43 via terminals 36 from color-killer circuit 25. The saturation this core is effective to detune filter 27 so that it has a substantially uniform impedance over the entire frequency range of signals supplied to it from amplifier

15 and essentially no signals are coupled through it to potentiometer 41 and output terminal 39. Thus, it will be seen that during color reception the response of apparatus 16 resembles FIG. 2*d* and no undesirable chrominance signals are coupled to signal-combining system 17.

It will be appreciated that in some receivers in accordance with the invention, it may be desired to provide a predetermined amount of high-frequency accentuation without providing for adjustability of this accentuation. This may be done by including fixed resistors instead of variable resistors 34 or 41, for example.

This invention makes possible a television receiver having improved resolution during monochrome reception and allowing subjective adjustment of the high-frequency portion of monochrome signals without disturbing the tuning for color reception. These advantages are made possible at little cost in components above those normally required in color receiver designs.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A compatible color-television apparatus for permitting subjective high-frequency accentuation during monochrome reception while retaining accurate tuning for color reception and for improving resolution during monochrome reception comprising: first means for supplying a wide bandwidth monochrome signal; second means coupled to said first means for separating said signal into two portions, a first portion including undesirable chrominance signal frequencies and a second portion comprising the remainder of said wide bandwidth signal; and means coupled to said second means for recombining said two portions so that during color reception undesirable chrominance signals are substantially deleted from the resulting signal but during monochrome reception a wide bandwidth signal is re-formed with high-frequency accentuation.

2. A compatible color-television apparatus for permitting subjective high-frequency accentuation during monochrome reception while retaining accurate tuning for color reception and for improving resolution during monochrome reception comprising: first means for supplying a wide bandwidth monochrome signal; second means coupled to said first means for separating said signal into two portions, a first portion including undesirable chrominance signal frequencies and a second portion comprising the remainder of said wide bandwith signal; and means coupled to said second means for recombining said two portions so that during color reception undesirable chrominance signals are substantially deleted from the resulting signal but during monochrome reception a wide bandwith signal is re-formed and the relative magnitudes of the two portions of this recombined signal are adjustable so as to permit high-frequency accentuation.

3. A compatible color-television apparatus for permitting subjective high-frequency accentuation during monochrome reception while retaining accurate tuning for color reception and for improving resolution during monochrome reception comprising: first means for supplying a wide bandwith monochrome signal; second means coupled to said first means for separating said signal into two portions, one portion including substantially all undesirable chrominance signal frequencies; and variable gain means coupled to said second means for recombining said two portions so that during color reception undesirable chrominance signals are substantially deleted from the resulting signal but during monochrome reception a wide bandwidth signal is re-formed and the relative magnitude of the described portion of this recombined signal is independently adjustable so as to permit high-frequency accentuation.

4. A compatible color-television apparatus for permitting subjective high-frequency accentuation during monochrome reception while retaining accurate tuning for color reception and for improving resolution during monochrome reception comprising: first means for supplying a wide bandwidth monochrome signal; second means coupled to said first means for separating said signal into two portions, a first portion including substantially all frequencies above the lowest undesirable chrominance signal frequency and a second portion comprising the remainder of said wide bandwith signal; and variable gain means coupled to said second means for recombining said two portions so that during color reception undesirable chrominance signals are substantially deleted from the resulting signal but during monochrome reception a wide bandwidth signal is re-formed and the relative magnitude of the first portion of this recombined signal is independently adjustably so as to permit high-frequency accentuation.

References Cited in the file of this patent

UNITED STATES PATENTS

| | | |
|---|---|---|
| 2,895,004 | Fredendall | July 14, 1959 |
| 2,910,528 | Petersen | Oct. 27, 1959 |